M. J. PAYNE.
VALVE FOR PNEUMATIC TIRES.
APPLICATION FILED FEB. 9, 1918.

1,333,091.

Patented Mar. 9, 1920.

Inventor
Marshall J. Payne,
by Chas. J. Williamson
Atty

UNITED STATES PATENT OFFICE.

MARSHALL J. PAYNE, OF STAUNTON, VIRGINIA, ASSIGNOR TO THE PAYNE VALVE CORPORATION, OF ROANOKE, VIRGINIA.

VALVE FOR PNEUMATIC TIRES.

1,332,091.      Specification of Letters Patent.      Patented Mar. 9, 1920.

Application filed February 9, 1918. Serial No. 216,207.

*To all whom it may concern:*

Be it known that I, MARSHALL J. PAYNE, of Staunton, in the county of Augusta, and in the State of Virginia, have invented a certain new and useful Improvement in Valves for Pneumatic Tires, and do hereby declare that the following is a full, clear, and exact description thereof.

My invention relates to valves, such for example, as those used for pneumatic tires of the type in which the internal pressure on the valve is utilized to hold it to its seat, and the object of my invention is to provide a valve of this description which may be positively held upon its seat regardless of the effect of the internal pressure upon the valve, and by mechanism which will be exceedingly simple so that its parts will be few and thus liability to get out of order eliminated, the opportunities for escape of the air or other fluid under pressure reduced to a minimum, and whose operation may be performed without any special knowledge or care on the part of the operator, and to this end my invention consists in the valve constructed substantially as hereinafter specified and claimed.

Figure 1:
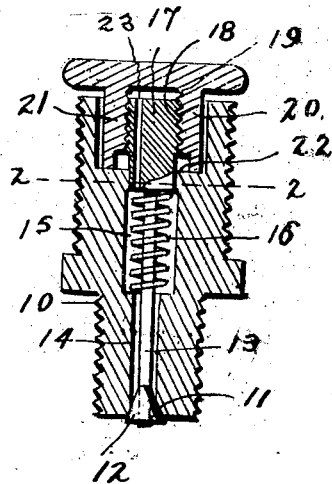
Figure 1 is a vertical section of a portion of a pneumatic tire valve embodying one form of my invention.
Figure 2:
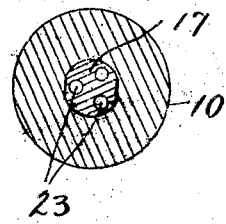
Fig. 2 is a horizontal section on the line 2—2 of Fig. 1.

In its general construction the embodiment of my invention shown in the drawings is similar to what is shown in my Patent No. 1,223,901, issued April 21, 1917, that is to say, there is a casing 10 having at its inner end a valve seat 11 of conical form with which coöperates a similarly shaped valve 12 having a stem 13 that extends outwardly through a longitudinal hole 14 of larger diameter than the valve stem to provide a space for the passage of air when the valve is off its seat, and the outer portion of said hole being enlarged to provide a chamber 15 to accommodate the coil spring 16 that acts upon the valve stem to yieldingly hold the valve to its seat. The outer portion of the valve stem is provided with an enlargement 17 which is a part of or is rigidly attached to the valve stem and enters a short distance within the outer end of the spring chamber 15 with the walls of which it has sliding engagement and beyond the chamber 15 it is provided with an external screw thread 18. The contacting surfaces of the valve stem enlargement 17 and the walls of the chamber 15 in Figs. 1 and 2 are flat so that while the valve and valve stem are free to move longitudinally to seat or unseat the valve, no rotary or turning movement is possible. To cause outward longitudinal movement of the valve to positively move it to its seat and hold it there, the thread 18 on the enlargement 17 is adapted for engagement by an internal thread 19 on a tubular extension 20 from the head of a cap 21. The cap 21 in Fig. 1 enters the outer end of the casing 10 when the tubular extension 20 is screwed upon the valve stem enlargement 17, and when the inner end of the cap 21 engages a shoulder 22 in said casing, the continued rotation of the cap 21 causes the outward longitudinal movement of the valve stem and thereby effects the seating of the valve.

The valve stem enlargement is provided with one or more holes 23 which extend throughout its length for the inward passage of air from the pump, or source of supply of air to the tire.

The spring 16 at its outer end bears against the inner end of said stem enlargement 17.

Figure 3:
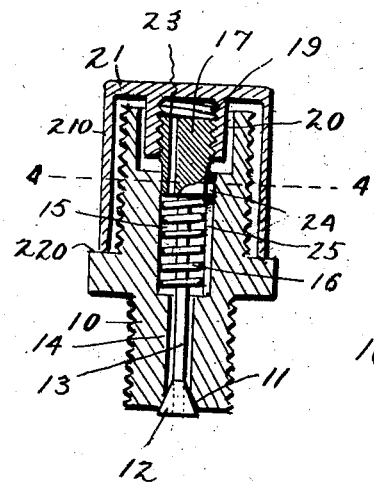
Fig. 3 is a view similar to Fig. 1 of another form of my invention.
Figure 4:
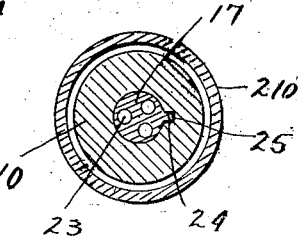
Fig. 4 is a horizontal section on the line 4—4 of Fig. 3.

As shown in Fig. 3 the cap 21 instead of entering the casing has an outer wall or shell 210 which passes loosely over the threaded portion of the casing which provides the air hose connection, and the lower end of said shell bears against the outer side of the flange 220 provided on the casing 10, the bearing thus provided corresponding to that provided by the shoulder 22 in Fig. 1. As shown in Figs. 3 and 4 instead of the stem rotating prevention means shown in Figs. 1 and 2, the stem rotating prevention means consists of a radial projection 24 on the stem enlargement 17 and a groove 25 in the wall of the chamber 15.

It will be understood that the screw thread engagement between the cap 21 and the valve stem engagement 17 may be reversed, that is to say, a threaded hole can be provided in the enlargement 17, and a screw or bolt provided on the cap which will enter said threaded enlargement.

Having thus described my invention what I claim is:

1. A device of the class described, including a casing with a passage extending therethrough and having a valve seat at the inner end of the passage, said passage being enlarged for a part of its length toward its outer end, a coil spring in said enlargement and bearing at its inner end on the bottom thereof, a valve, a cap at the outer end of the casing, a connection between the cap and the valve comprising a stem and an enlarged, threaded, cap-engaging portion that provides a bearing for the outer end of the spring, the thread of said portion being engaged by the thread on the cap, means comprising coacting surfaces on the wall of said passage enlargement and said enlarged cap-engaging portion, to prevent rotation of the latter when the cap is turned, while allowing axial movement, and a shoulder on the casing adapted for engagement by the cap when rotated, to prevent axial movement of the cap and to maintain the valve on its seat.

2. A device of the character described including a valve body open at its ends and at one end provided with a valve seat, a valve stem fitted within the valve body through the outer end thereof, means integral with the stem and adapted to coact with the valve body for permanently limiting the stem against inward displacement through the inner end of the valve body, a valve carried by said stem to coöperate with said seat and locking the valve against outward displacement through the outer end of the valve body, and means adapted to engage said stem at its outer end coacting with the valve body for binding the valve in engagement with said seat.

3. A device of the character described including a valve body provided with a valve seat, a valve stem slidably fitted within the valve body and formed with an enlargement thereon provided with means coöperating with the valve body for holding the stem against turning movement, said enlargement permanently limiting the stem against inward displacement through the inner end of the valve body, a valve carried by the stem to coöperate with said seat and locking the stem against outward displacement through the outer end of the valve body, and means adapted to engage said stem at its outer end coacting with the valve body for binding the valve in engagement with said seat.

4. A device of the character described including a valve body provided with a valve seat, a valve stem slidably fitted within the valve body and having an integral shoulder formed thereon, the outer end portion of said stem beyond the shoulder being enlarged to form a threaded stud, means carried by said shoulder and coacting with the valve body for holding the stem against rotation, a valve carried by the stem to coöperate with said seat, and a cap for the valve body adapted to engage said stud coacting with the valve body for binding the valve in engagement with said seat.

5. A device of the character described including a valve body open at its ends and provided at its inner end with a valve seat, a valve stem fitted within the valve body through the outer end thereof, the stem being formed with a shoulder rigidly fixed thereto and being enlarged above said shoulder to provide a stud, means carried by the shoulder to coact with the valve body whereby the stem will be locked against turning movement a valve connected to the inner end of the stem to coöperate with said seat and locking the stem against outward displacement through the outer end of the valve, the shoulder being adapted to permanently prevent inward displacement of the stem through the inner end of the valve body, a spring bearing between the valve body and said shoulder and normally holding the valve in engagement with said seat, and a cap adapted to have threaded engagement with said stud coacting with the valve body for binding the valve against the seat.

In testimony that I claim the foregoing I have hereunto set my hand.

MARSHALL J. PAYNE.